United States Patent
Busch

(10) Patent No.: US 7,425,824 B2
(45) Date of Patent: Sep. 16, 2008

(54) MAGNETORESISTIVE SENSOR

(75) Inventor: Nicholas F. Busch, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 103 days.

(21) Appl. No.: 11/157,659

(22) Filed: Jun. 20, 2005

(65) Prior Publication Data
US 2006/0261801 A1 Nov. 23, 2006

Related U.S. Application Data

(60) Provisional application No. 60/683,628, filed on May 20, 2005.

(51) Int. Cl.
G01B 7/30 (2006.01)
G01R 33/05 (2006.01)
G01R 33/09 (2006.01)

(52) U.S. Cl. .................. 324/207.25; 324/207.21; 324/249; 324/252

(58) Field of Classification Search ............ 324/207.21, 324/207.24–207.26, 249, 252; 73/514.16, 73/514.31, 514.39; 338/32 R, 32 H
See application file for complete search history.

(56) References Cited

U.S. PATENT DOCUMENTS

| | | | | |
|---|---|---|---|---|
| 5,088,930 A * | 2/1992 | Murphy | | 439/70 |
| 5,351,028 A | 9/1994 | Krahn | | |
| 5,477,143 A | 12/1995 | Wu | | |
| 5,500,589 A | 3/1996 | Sumcad | | |
| 5,596,272 A | 1/1997 | Busch | | 324/207.21 |
| 5,729,128 A | 3/1998 | Bunyer et al. | | 324/202 |
| 5,912,556 A | 6/1999 | Frazee et al. | | 324/207.2 |
| 6,366,079 B1 * | 4/2002 | Uenoyama | | 324/207.21 |
| 6,404,188 B1 | 6/2002 | Ricks | | 324/207.22 |
| 6,469,927 B2 | 10/2002 | Spitzer et al. | | 365/173 |
| 6,538,429 B2 | 3/2003 | Schroeder et al. | | 324/207.2 |
| 6,577,123 B2 | 6/2003 | Schroeder et al. | | 324/207.24 |
| 6,616,713 B2 * | 9/2003 | Sano et al. | | 29/25.03 |
| 6,630,821 B2 * | 10/2003 | Shinjo et al. | | 324/207.21 |
| 6,870,365 B1 * | 3/2005 | Yokotani et al. | | 324/207.25 |
| 6,924,639 B2 * | 8/2005 | Uenoyama | | 324/207.21 |
| 6,977,497 B1 * | 12/2005 | Yokotani et al. | | 324/207.21 |
| 2003/0197503 A1 | 10/2003 | Kawano et al. | | |

(Continued)

FOREIGN PATENT DOCUMENTS

DE 3426784 A1 1/1986

(Continued)

Primary Examiner—Bot LeDynh
(74) Attorney, Agent, or Firm—Matthew F. Lambrinos; Luis M. Ortiz; Kermit D. Lopez

(57) ABSTRACT

A magnetic sensor, system and method include a magnet located proximate to a target comprising a plurality of teeth and a plurality of slots formed therebetween. An integrated circuit is located on a side of the magnet wherein the integrated circuit comprises a plurality of magnetoresistive bridge components. The integrated circuit and the magnet are configured into a sensor package, such that the magnetoresistive bridge components enable the detection of a target tooth when one half of the plurality of magnetoresistive bridge components come into proximity with an edge of a tooth before that of another half of the magnetoresistive bridge components as the tooth and an associated slot thereof pass by the sensor package.

17 Claims, 7 Drawing Sheets

U.S. PATENT DOCUMENTS

| | | |
|---|---|---|
| 2004/0207392 A1 * | 10/2004 | Kernhof ................ 324/207.25 |
| 2004/0232906 A1 | 11/2004 | Taneyhill |
| 2005/0279919 A1 * | 12/2005 | Tanaka et al. ............ 250/214.1 |
| 2007/0018642 A1 * | 1/2007 | Ao .............................. 324/252 |

FOREIGN PATENT DOCUMENTS

| | | |
|---|---|---|
| DE | 19800444 A1 | 7/1998 |
| DE | 10210184 A1 | 9/2003 |
| EP | 0464892 A2 | 1/1992 |
| EP | 1058324 A1 | 12/2000 |
| JP | 54112168 A * | 9/1979 |
| WO | WO03/046594 A1 | 6/2003 |
| WO | WO03/046595 A1 | 6/2003 |

* cited by examiner

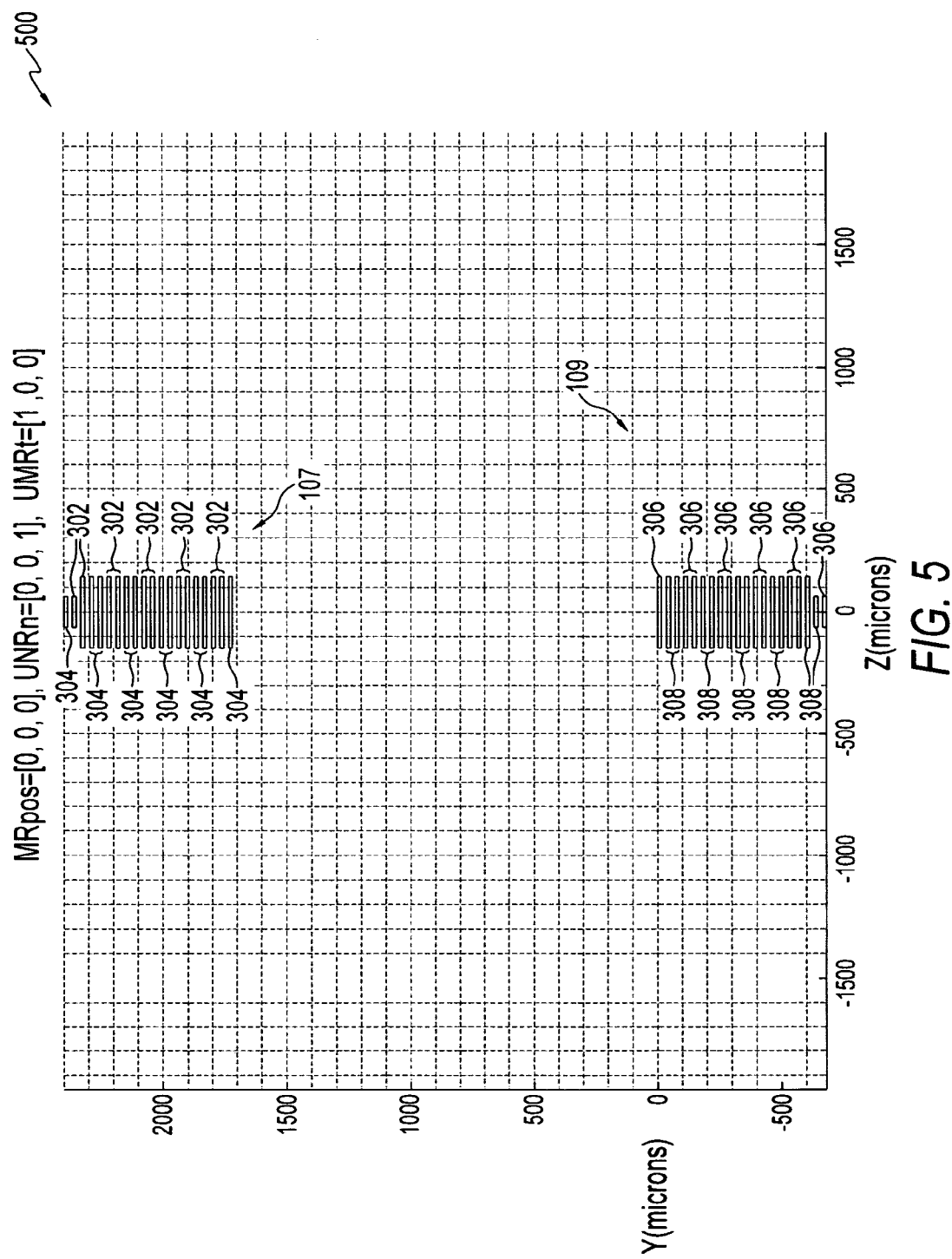

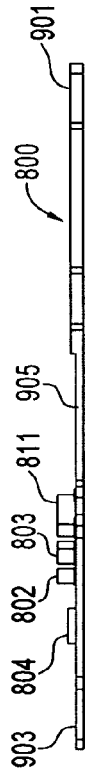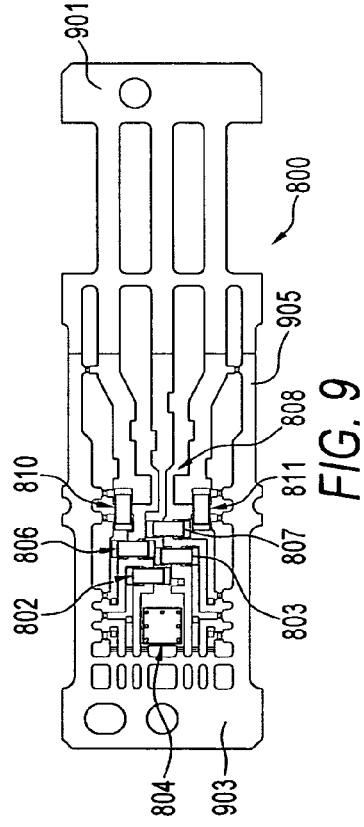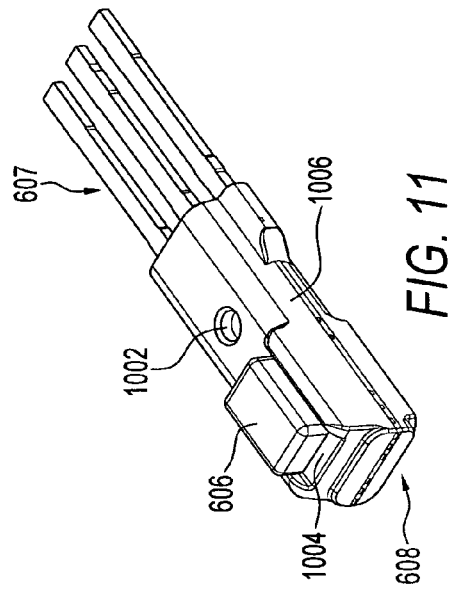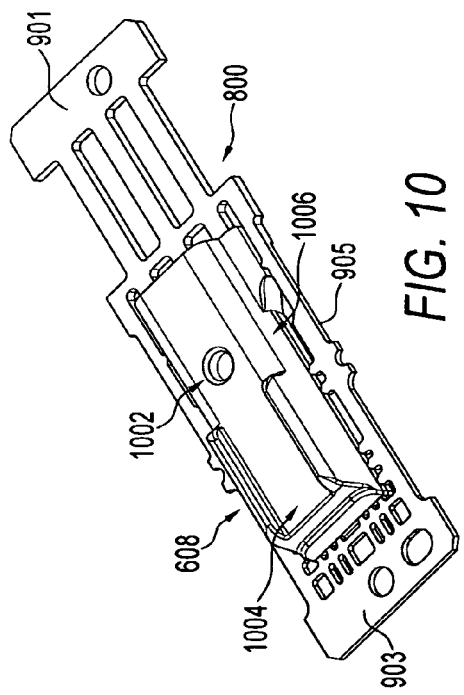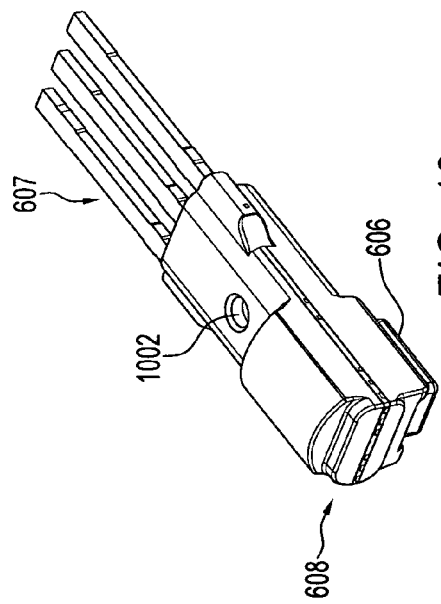

MAGNETORESISTIVE SENSOR

CROSS-REFERENCE TO PROVISIONAL PATENT APPLICATION

This patent application claims priority under 35 U.S.C. § 119(e) to provisional patent application Ser. No. 60/683,628 entitled "Magnetoresistive Sensor," which was filed on May 20, 2005, the disclosure of which is incorporated herein by reference.

TECHNICAL FIELD

Embodiments are generally related to magnetoresistive sensors. Embodiments are also related to geartooth, crankshaft and camshaft sensors. Embodiments additionally relate to speed and transmission sensors. Embodiments additionally relate to Chip-On-Lead-Frame (COLF) construction techniques and packaging components thereof.

BACKGROUND OF THE INVENTION

Many different types of sensors are known to those skilled in the art. Some sensors utilize permanent magnets to detect the presence or absence of a magnetically permeable object within a certain predefined detection zone relative to the sensor. In combination with the permanent magnet, some sensors of this type utilize Hall Effect elements located at particular positions relative to the permanent magnet and other. Sensors utilize magnetoresistive elements disposed at advantageous positions relative to the permanent magnet. Proximity sensors of this type, for example, whether they use Hall effect elements or magnetoresistive elements, can be configured to sense the presence or absence of a magnetically permeable object passing through a detection zone in a direction generally perpendicular to a central axis of the permanent magnet or, alternatively, can be configured to detect the distance of a magnetically permeable object moving in a direction toward or away from a pole face of the permanent magnet along with a path that is generally parallel to the central axis of the magnet.

One example of a magnetic sensor, which has been implemented, is a temperature stable proximity sensor, which senses magnetic flux emanating from the lateral surface of a permanent magnet. In such a configuration, a ferrous object sensor detects the presence or absence of an object of high magnetic permeability, such as a tooth or a notch on a rotatable mounted ferrous wheel at zero speed and immediately upon power-up.

Such a device can therefore be utilized as a proximity sensor and can be configured with a permanent magnet and a magnetic flux responsive sensor which has a sensing plane and which produces an electrical output signal that varies as a function of the change in magnetic flux density. In such a configuration the ferrous body sensor assembly does not rely upon pole face magnetism as some known conventional sensors do but, instead, relies upon the radial component of magnetic flux density emanating from a lateral surface of the magnet between the opposing pole faces. Since the ferrous object sensor assembly does not rely on pole face magnetism, its electrical output signal is relatively stable over a relatively wide temperature range.

In another magnetic sensor arrangement, a geartooth position and speed sensor can be configured with four magnetic resistance tracks connected in a bridge circuit arrangement. To simplify a field plate effect speed and position sensor, four meander-arranged Permalloy resistance tracks can be located on a substrate at the corners of a rectangle. Such components can be spaced, in the circumferential direction, by approximately half the pitch distance of the teeth of a gear. The resistance can be connected in a voltage divider configuration or in the form of a bridge circuit supplied with a constant current source to eliminate temperature variation effects. In a preferred embodiment, the resistances are formed as meander-shaped thin film vapor deposited tracks on a silicon substrate. A permanent magnet can then be utilized to provide bias magnetization.

In magnetic sensors of the general type described above, a magnetically sensitive component is generally used to provide a signal representing the strength of a magnetic field in a particular direction. If a Hall Effect element is used in association with the permanent magnet, the signal from the Hall element represents the magnetic field strength component in a direction perpendicular to the sensing plane of the Hall device. If, on the other hand, a magnetoresistive element is used in association with the permanent magnet, the signal from the magnetoresistive element represents the magnetic field strength in a direction within the sensing plane of the magnetoresistive element and perpendicular to its thinnest dimension. Depending on the particular application and performance requirements of the sensor, either Hall Effect elements or magnetoresistors can be used. Throughout the literature describing the prior art, sensors of this general type are occasionally described as proximity sensors and alternatively described as geartooth sensors, depending on the intended application of the sensor.

In most proximity sensors, for example, several attributes are advantageous. For example, in a geartooth sensor used in association with an internal combustion engine, an advantageous characteristic is the ability to provide a signal upon startup that identifies the presence or absence of a geartooth in a predefined detection zone without the necessity of gear movement. This is known as a power-up recognition capability. Another advantageous characteristic of a geartooth sensor or a proximity sensor is its reduced size. The size of such a sensor is usually affected by the size of the permanent magnet and the relative positions of the magnetically sensitive component and the permanent magnet.

One example of a magnetic sensing application is disclosed in U.S. Pat. No. 5,477,143, entitled "Sensor With Magnetoresistors Disposed on a Plane Which is Parallel to and Displaced from the Magnetic Axis of a Permanent Magnet," which issued to Mien T. Wu on Dec. 19, 1995, and is assigned to Honeywell International Inc. U.S. Pat. No. 5,477,143 is incorporated herein by reference and generally describes a proximity sensor with two magnetoresistive elements arranged in a common plane and displaced from a lateral surface of a permanent magnet. The common sensing plane of the magnetoresistive elements extends in a direction generally parallel to a magnetic axis of a permanent magnet that extends between the north and south poles of the magnet. In the configuration of U.S. Pat. No. 5,477,143, a detection zone can be defined relative to a pre-selected magnetic pole face and the magnetoresistive elements provide first and second signals that can be compared to define a third signal which is representative of the presence or absence of the magnetically permeable object within the detection zone. The magnetoresistive elements can each have a plurality of magnetoresistors, which are arranged in a Wheatstone bridge configuration for the purpose of providing the first and second signals described above.

One of the problems with magnetic detection devices, such as the sensors described above, is that such devices, while adequate for tooth and slot detection, are not very reliable or efficient in detecting a tooth edge. The ability to detect the edge of a target tooth is important and critical for recently developed gear tooth devices, crankshaft and camshaft devices, turbo charger impellers, automotive transmission components, and so forth. It is believed that the configuration disclosed herein overcomes the problems associated with the aforementioned sensing devices.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved magnetoresistive sensor.

It is another aspect of the present invention to provide for an anisotropic magnetoresistive (AMR) sensor.

It is yet another aspect of the present invention to provide for a sensor, which can be utilized for geartooth, crankshaft and camshaft sensing applications and the like.

It is a further aspect of the present invention to provide for an AMR sensor, which can be configured utilizing Chip-On-Lead-Frame (COLF) construction techniques and packaging components thereof.

The aforementioned aspects and other objectives and advantages can now be achieved as described herein. A magnetic sensor, system and method are disclosed in which a magnet is located proximate to a target comprising a plurality of teeth and a plurality of slots formed therebetween. An integrated circuit is located on a side of the magnet wherein the integrated circuit comprises a plurality of magnetoresistive bridge components. The integrated circuit and the magnet are configured into a sensor package, such that the magnetoresistive bridge components enable the detection of a target tooth when one half of the plurality of magnetoresistive bridge components come into proximity with an edge of a tooth before that of another half of the magnetoresistive bridge components as the tooth and an associated slot thereof pass by the sensor package.

In general, the plurality of magnetoresistive bridge components can be configured to comprise a first group of magnetoresistive bridge components and a second group of magnetoresistive bridge components. The first group of magnetoresistive components can be located within a first region of the integrated circuit and the second group of magnetoresistive bridge components is generally located within a second region of the integrated circuit. The plurality of magnetoresistive bridge components can be arranged in an AMR Wheatstone bridge configuration composed of, for example, four or more magnetoresistors. Such magnetoresistive bridge components can be, for example, anisotropic magnetoresistive (AMR) transducers. The target itself can be, for example, a crankshaft, a camshaft, etc.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 5 illustrates a micron-level top layout view of magnetoresistive bridge components, which can be implemented in accordance with one embodiment;

FIG. 8 illustrates a side view of a stepped lead frame configuration that can be implemented in accordance with an embodiment;

FIG. 9 illustrates a top view of the stepped lead frame depicted in FIG. 8, in accordance with one embodiment;

FIG. 10 illustrates a perspective view of the sensor module depicted in FIG. 6 implemented upon the stepped lead frame depicted in FIGS. 8-9, in accordance with one embodiment;

FIG. 11 illustrates a top perspective view of the sensor module depicted in FIG. 6 and the leads thereof in accordance with a preferred embodiment;

FIG. 12 illustrates a bottom perspective view of the sensor module depicted in FIG. 11, in accordance with a preferred embodiment;

DETAILED DESCRIPTION

The particular values and configurations discussed in these non-limiting examples can be varied and are cited merely to illustrate at least one embodiment and are not intended to limit the scope thereof.

Figure 1:
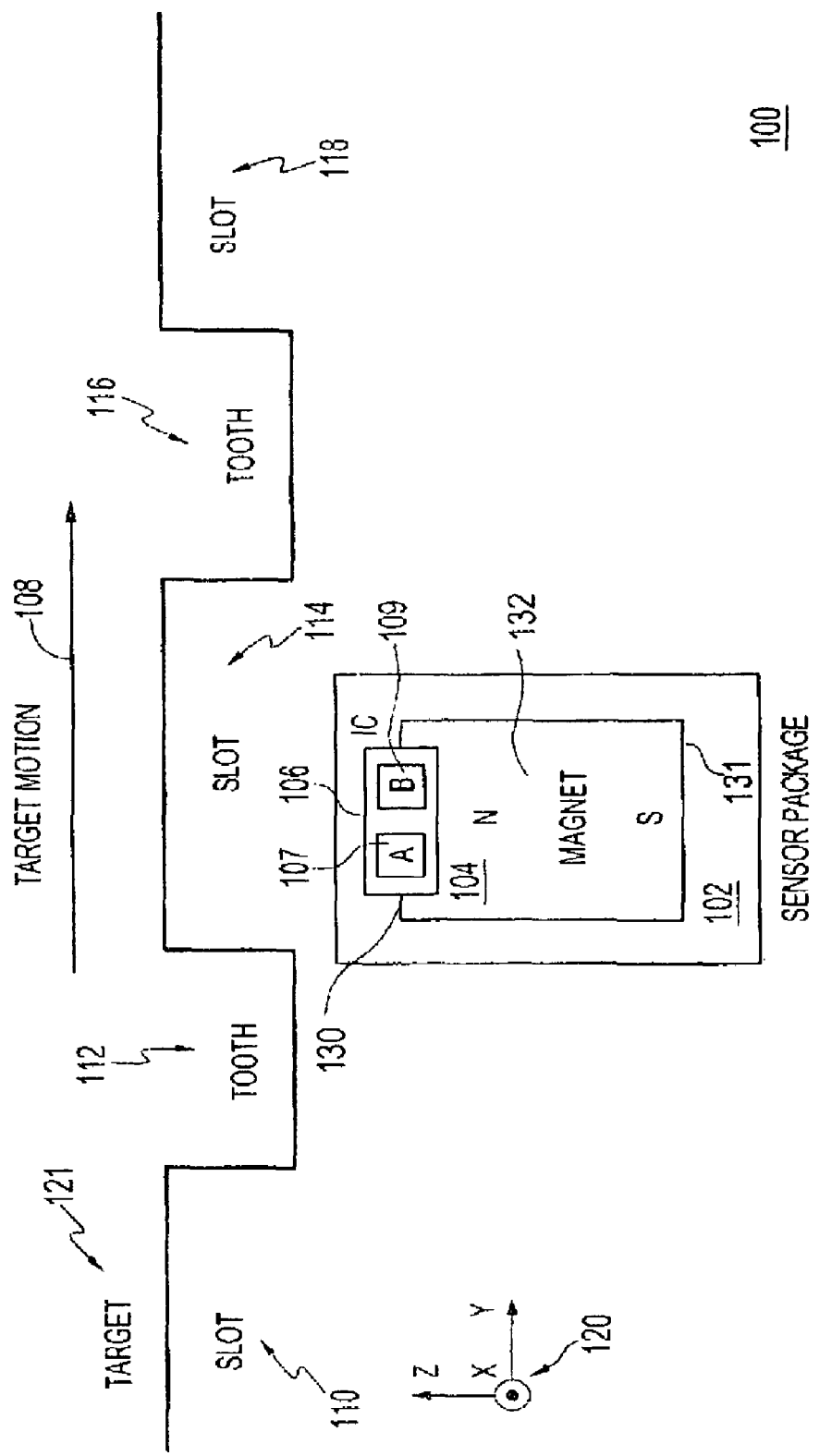
FIG. 1 illustrates a block diagram of an X-axis view of a magnetoresistive sensing system including a sensor package and a target being sensed, in accordance with a preferred embodiment.

FIG. 1 illustrates a block diagram of an X-axis view of a magnetoresistive sensing system 100 including a sensor package and a target being sensed, in accordance with a preferred embodiment. Note that in FIGS. 1-5 herein, identical or similar parts or elements are generally indicated by identical reference numerals. System 100 generally includes a magnet 104 located proximate to a target 121 having a plurality of teeth 112, 116 and a plurality of slots 110, 114, 118 thereof. Slot 112 is formed to the left of tooth 112 while slot 114 is configured between tooth 112 and 116. Slot 118 is located to the right of tooth 116. Although only a few teeth 112, 116 and a few slots 110, 114, 118 are depicted in the configuration of system 100, it can be appreciated that target 121 can be formed with many additional slots and teeth depending upon design considerations. Note that the target 121 is typically round, but is depicted in FIG. 1 in a "straight" configuration for general simplification and edification purposes only. The magnet 104 has a first end 130 located proximate the target 121 and a second end 131 located away from the target.

An integrated circuit (IC) 106 is located at one side of the magnet 104. In the configuration of system 100, the IC 106 is configured at the north (N) side of magnet 104. The IC 106 generally incorporates a plurality of magnetoresistive bridge components 107 and 109, which are respectively identified as "A" and "B" in FIG. 1. The IC 106 and the magnet 104 are configured into a sensor package 102. The magnetoresistive bridge components 107 and 109 enable the detection of a target tooth when one half of the magnetoresistive bridge components (i.e., "A" or "B") come into proximity with an edge of a tooth (e.g., tooth 112) before that of another half of the magnetoresistive bridge components as the tooth and an associated slot thereof pass by the sensor package 102. Note that in FIG. 1, target motion 108 is generally indicated by an arrow, while in FIG. 2, target motion 108 is depicted as a dot. Note that in FIGS. 1-3, an x-y-z coordinate indicator 120 is also illustrated for perspective purposes.

The magnetoresistive bridge components include a first group of magnetoresistive bridge components 107 (i.e. "A") and a second group of magnetoresistive bridge components (i.e., "B"). The first group of magnetoresistive bridge components 107 can be located within a first region of the IC 106 and the second group of magnetoresistive bridge components 109 is generally located within a second region of the IC 106. The plurality of magnetoresistive bridge components 107, 109 can be arranged in an AMR Wheatstone bridge configuration composed of, for example, four or more magnetoresistors. Such an arrangement is depicted in greater detail herein with respect to FIG. 4. Such magnetoresistive bridge components 107, 100 can be, for example, anisotropic magnetoresistive (AMR) transducers. The target 121 can be, for example, a crankshaft, a camshaft, etc. Note that in system 100, the region "A" area on IC 106 can be occupied by AMR Wheatstone Bridge resistors, such as resistors R2 and R4 depicted in FIGS. 3-4, while the "B" area can be occupied by resistors R1 and R3, also depicted in FIGS. 3-4, depending upon design considerations.

Figure 2:
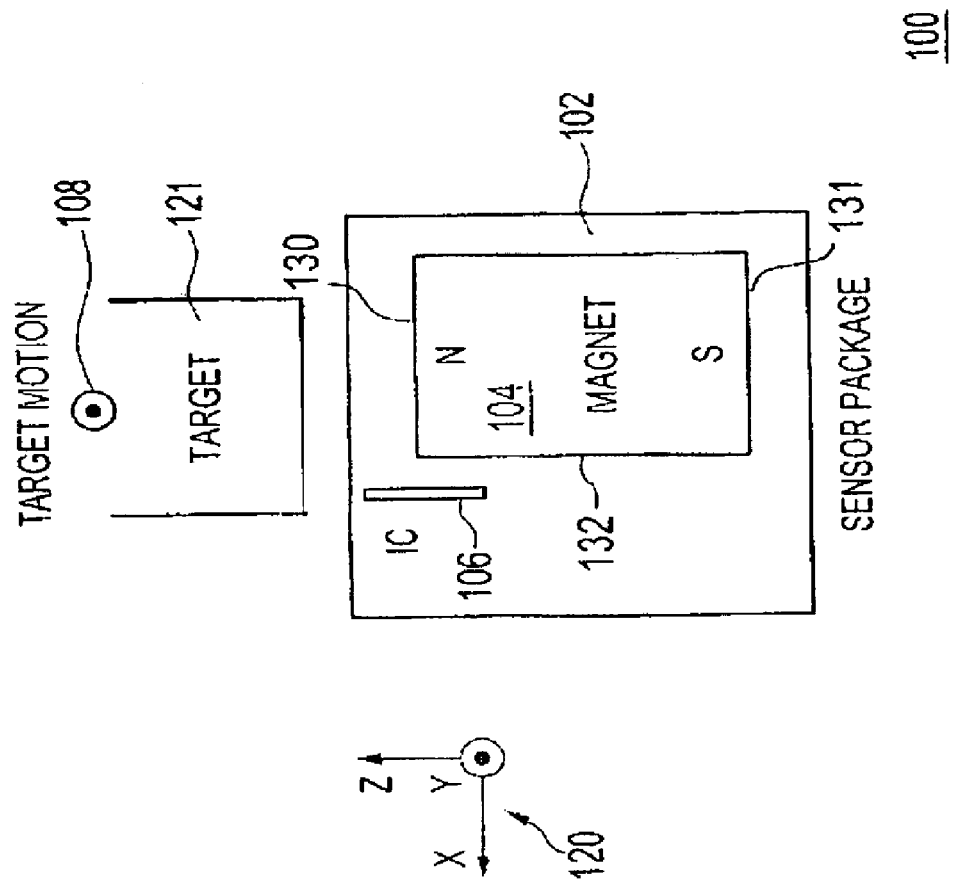
FIG. 2 illustrates a block diagram of a Y-axis view of the magnetoresistive sensing system depicted in FIG. 1, in accordance with a preferred embodiment.
Figure 3:
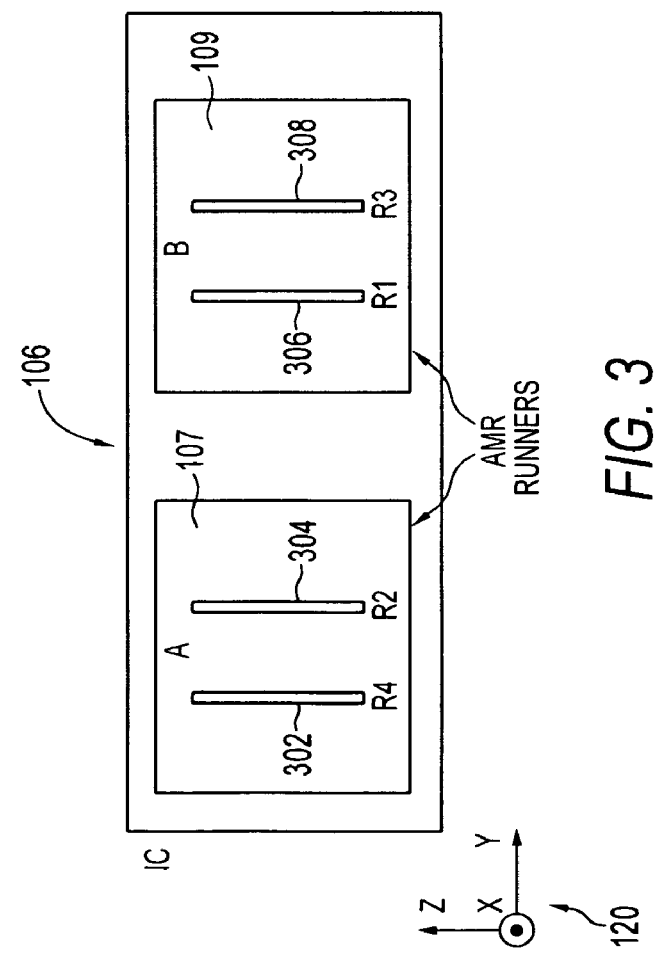
FIG. 3 illustrates a block diagram of a general layout for an AMR bridge configuration that can be implemented in accordance with the magnetoresistive system depicted in FIGS. 1-2.

FIG. 2 illustrates a block diagram of a Y-axis view of the magnetoresistive sensing system 100 depicted in FIG. 1, in accordance with a preferred embodiment. As can be seen from FIGS. 1 & 2, IC 106 is located proximate the first end 130 of magnet 104 and facing the magnet side 132 which extends between the first and second ends 130, 131. FIG. 3 illustrates a block diagram of general layout for an AMR bridge configuration that can be implemented in accordance with the magnetoresistive system 100 depicted in FIGS. 1-2. In FIG. 3, for example, IC 106 is shown in greater detail. The group "A" magnetoresistive components 107 can be disposed of AMR runners 302 and 304, while the group "B" magnetoresistive components 109 are generally composed of AMR runners 306 and 308. The AMR runners 302, 304, 306, and 308 depicted in FIG. 3 are generally shown as vertical strips (i.e., Z-direction), but AMR runners 302, 304, 306, and 308 can also be laid out as horizontal strips (i.e., X-direction) or some other path, depending upon design considerations. The best layout for the AMR bridge (e.g., see FIG. 4) is application dependent. A typical layout could have, for example, the "A" side and "B" side as mirror images, but some applications can benefit from a non-symmetrical layout, again depending upon design considerations.

Figure 4:
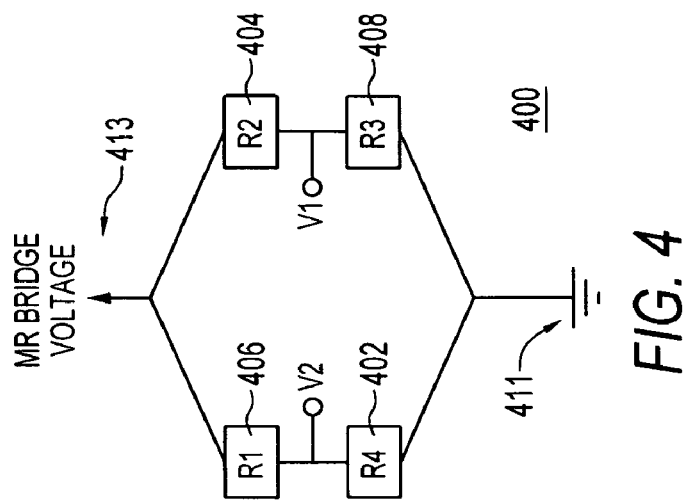
FIG. 4 illustrates an electrical schematic diagram of a magnetoresistive bridge configuration that can be implemented in accordance with the system depicted in FIGS. 1-3 herein, in accordance with a preferred embodiment.

FIG. 4 illustrates an electrical schematic diagram of a magnetoresistive bridge circuit 400 that can be implemented in accordance with the system 100 depicted in FIGS. 1-3 herein, in accordance with a preferred embodiment. Bridge circuit 400 generally comprises an AMR bridge and includes four magnetoresistive components (e.g., AMR transducers) 402, 406, 404, and 408. Components 402 and 408 are generally connected to one another and to ground 411. Components 406 and 404 are also connected to each other and to a magnetoresistive (MR) bridge voltage 413. AMR runner 302 depicted in FIG. 3 is generally analogous to component 402 depicted in FIG. 4, while AMR runner 304 is analogous to component 404. Similarly, AMR runner 306 is analogous to component 406 and AMR runner 308 is analogous to component 408.

It should be appreciated that AMR bridge circuit 400 depicted in FIG. 4 is represented as by an electrical schematic and does not imply an actual layout (i.e., where the resistors are physically located on the IC). The dimensions of magnet 104 and the components of AMR bridge circuit 400 can vary depending on the specific requirements of the application, such as the allowed size of sensor package 102, the dimensions of target 121, and the sensor package 102 to target 121 positioning and the like. Locating the IC 106 at one side of magnet 104 facilitates manufacturability and allows for a relatively flat leadframe upon which electrical components can be placed, while not requiring a 90-degree bend in the leadframe near the face of the sensor for placing components between magnet face and the target, which is common in conventional designs. The layout of AMR bridge circuit 400 together with system 100 is suitable for use, for example, as an automotive crank sensor and also enables packaging thereof using the Chip-On-Lead Frame (COLF) process.

System 100 and AMR bridge circuit 400 depicted in FIGS. 1-4 herein provide two general features that render the overall design thereof unique. First, as indicated above, placing the IC 106 on the side of the magnet 104 facilitates manufacturability by allowing for a relative flat leadframe upon which electrical components can be placed, without requiring the 90 degree bend in the leadframe near the face of the sensor for placing components between the magnet face and the target 121. Second the AMR bridge circuit 400 layout enables tooth edge detection as opposed to tooth slot detection, by allowing one half of the AMR bridge circuit 400 to come into proximity with the target tooth before the other half, as the target tooth and slot features pass by the sensor. By combing such features as indicated herein, a unique sensor, including a system and method thereof, can be utilized, for example, for gear tooth sensing applications, crank positions sensors, turbo charger impeller speed sensors (i.e., using eddy currents) and also speed sensors such as those utilized in automotive transmissions.

FIG. 5 illustrates a micron-level top layout view of magnetoresistive bridge components 107 and 109, in accordance with one possible embodiment. Components 107 and 109 are depicted in FIG. 5 with respect to a graph 500, which plots X versus Z dimensions at the micron level. As illustrated in graph 500 runners 302 and 304 are associated with magnetoresistive bridge component 107, while runners 306 and 308 are associated with magnetoresistive bridge component 109. It can be appreciated that the configuration depicted in FIG. 5 represents one possible implementation of magnetoresistive bridge components 107 and 109 and are presented herein for general edification and exemplary purposes only. A variety of other configurations are possible with additional or fewer runners, depending upon design considerations and the goals of the sensing application.

Figure 6:
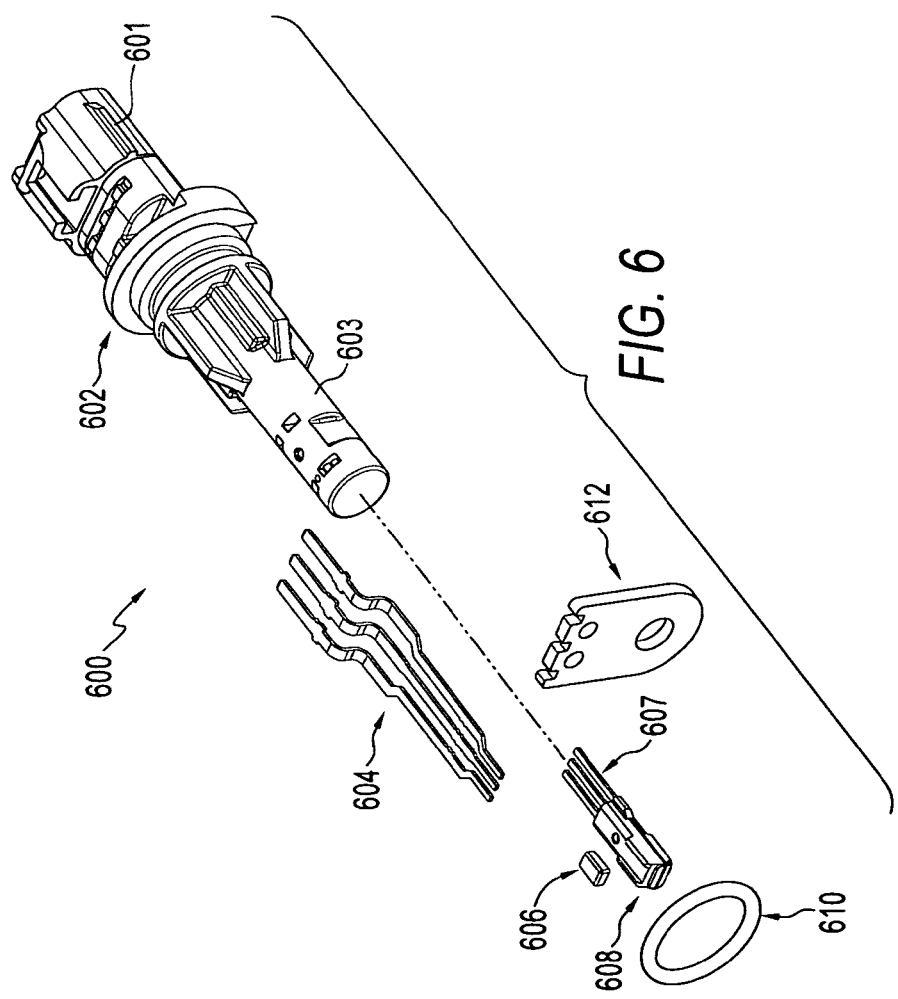
FIG. 6 illustrates a perspective and exploded view of a design for a sensor, which can be implemented in accordance with an alternative embodiment.

FIG. 6 illustrates a perspective and exploded view of a design for a sensor 600, which can be implemented in accordance with an alternative embodiment. Note that in FIGS. 6-15, identical or similar parts are indicated generally by identical reference numerals. The configuration depicted in FIGS. 6-15 therefore represents one possible implementation of the magnetoresistive sensing system 100 and components thereof depicted and described herein with respect to FIGS. 1-5. The sensor 600 depicted in FIGS. 6-15 can be implemented utilizing the Chip-On-Lead Frame (COLF) process described earlier.

Figure 7:
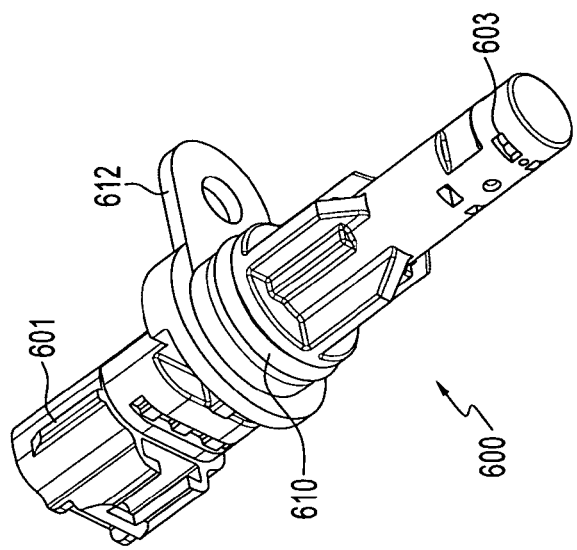
FIG. 7 illustrates a perspective view of the complete sensor configuration, in accordance with the embodiment depicted in FIG. 6.

Sensor 600 includes an over-mold portion 602 having a rear portion 601 and a front portion 603. The over-mold portion 600 is utilized to maintain a leadframe 604, a magnet 606, and a sensor module 608 that includes three electrical lead portions 607. A mounting bracket 612 can also be provided as indicated in FIG. 6. Note that FIG. 7 illustrates a perspective view of the complete sensor 600 configuration, in accordance with the embodiment depicted in FIG. 6.

FIG. 8 illustrates a side view of a configuration for a stepped lead frame 800 that can be implemented in accordance with an embodiment. The stepped lead frame 800 can support a die or IC 804 in association with reference capacitors 802, 803. Additionally, stepped lead frame 800 can be utilized to maintain a ferrite bead 811. Note that FIG. 9 illustrates a top view of the stepped lead frame 800 depicted in FIG. 8, in accordance with one embodiment. As depicted in FIG. 8, stepped lead frame 800 additionally supports a ferrite bead 810 and optional pull-up resistors 808. Filter capacitors 806 and 807 can also be supported by the stepped lead frame 800. As indicated in FIGS. 8-9, the stepped lead frame 800 generally includes a rear portion 901 and a front portion 903 and an approximately middle portion 905 therebetween. IC or die 804 is located closer to the front portion 903 of the stepped lead frame 800. Note that IC 804 is analogous to the IC 106 depicted in FIG. 3, which implements the AMR bridge circuit 400 depicted in FIG. 4 and the configuration depicted in FIG. 5. Other AMR layouts can be utilized depending of course, upon design considerations.

FIG. 10 illustrates a perspective view of the sensor module 608 depicted in FIG. 6 implemented upon the stepped lead frame 800 depicted in FIGS. 8-9, in accordance with one embodiment. As indicated in FIG. 10, The sensor module 608 can be placed upon and maintained by the stepped lead frame 800. Note that the sensor module 608 can be formed from a thermoset epoxy 1006 and can be configured with a locating feature 1002. A magnet slot 1004 can also be formed from the body of sensor module 608. The magnet slot 1004 can be utilized to maintain the magnet 606 depicted, for example, in FIG. 6.

FIG. 11 illustrates a top perspective view of the sensor module 608 depicted in FIG. 6 and the leads 606 thereof in accordance with a preferred embodiment. FIG. 12 illustrates a bottom perspective view of the sensor module 608 depicted in FIG. 11, in accordance with a preferred embodiment. Note that in FIGS. 11-12, magnet 606 is shown disposed within magnet slot 1004, while a plurality of leads 607 extends from sensor module 608. A locating feature 1200 is shown configured at one side of the sensor module 608 while the locating feature 1002 that was illustrated previously with respect to FIG. 10 is shown in FIG. 11. The sensor module 608 depicted in FIGS. 11-12 therefore represents a single, calibrated sensor module that can be implemented in accordance with one possible embodiment.

Figure 14:
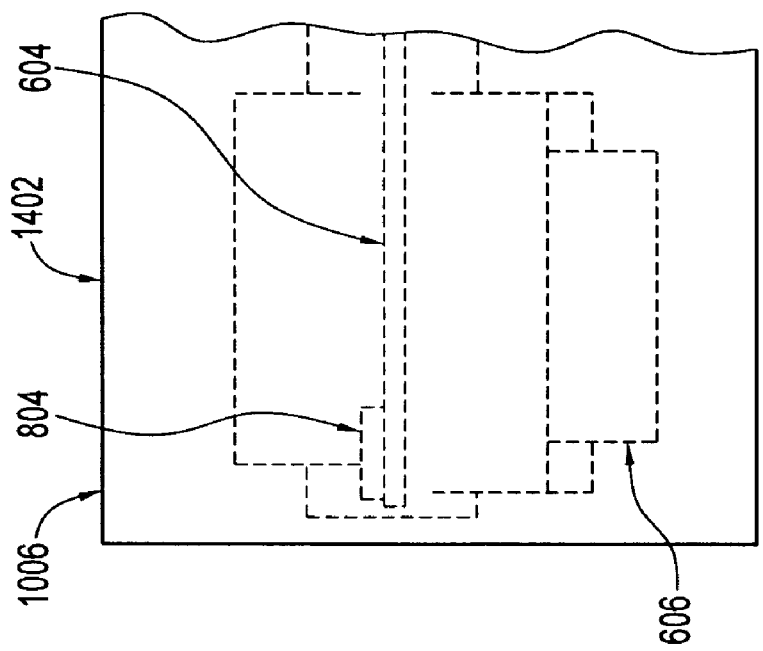
FIG. 14 illustrates a cut-away side view of the magnetoresistive sensor depicted in FIG. 13.
Figure 13:
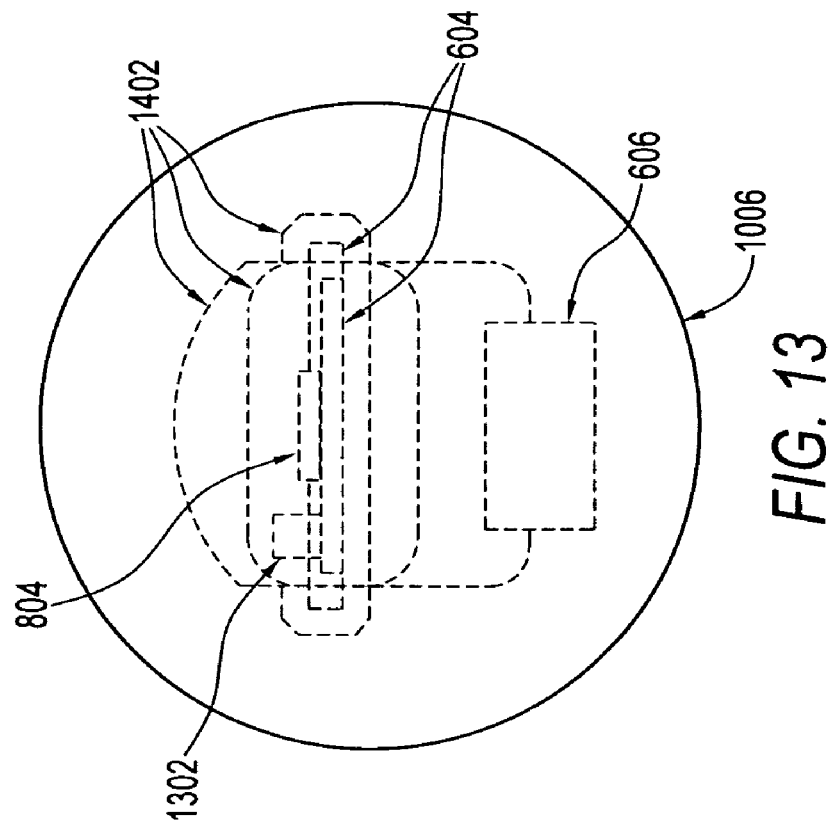
FIG. 13 illustrates a cut-away front view of magnetoresistive sensor depicted in FIGS. 6-7 in accordance with an embodiment.

FIG. 13 illustrates a cut-away front view of magnetoresistive sensor 600 depicted in FIGS. 6-7 in accordance with an embodiment. FIG. 14 illustrates a cut-away side view of the magnetoresistive sensor depicted in FIG. 13. In FIGS. 13-14, identical or similar parts or elements are generally indicated by identical reference numerals. Thus, the IC or die 804 is illustrated in FIGS. 13-14, along with the magnet 606. A thermoplastic body 1006 is also illustrated in FIGS. 13-14, along with a thermoset module portion 1402 and leadframe 604. A component 1302 can be located near the leadframe 604.

Based on the foregoing, it can be appreciated that a magnetic sensor, system and method can be implemented in which a magnet 606 is located proximate to a target comprising a plurality of teeth and a plurality of slots formed therebetween. An integrated circuit or die 804 can be located on a side of the magnet wherein the integrated circuit or die 804 comprises a plurality of magnetoresistive bridge components as described herein, for example, with respect to FIGS. 1-5. The integrated circuit 804 and the magnet 606 can be configured into a sensor package, such that the magnetoresistive bridge components, such as, for example, four magnetoresistive components (e.g., AMR transducers) 402, 406, 404, and 408, enable the detection of a target tooth when one half of the plurality of magnetoresistive bridge components come into proximity with an edge of a tooth before that of another half of the magnetoresistive bridge components as the tooth and an associated slot thereof pass by the sensor package.

In general, magnetoresistive bridge components can be configured to comprise a first group of magnetoresistive bridge components and a second group of magnetoresistive bridge components. The first group of magnetoresistive components can be located within a first region of the integrated circuit and the second group of magnetoresistive bridge components is generally located within a second region of the integrated circuit. The plurality of magnetoresistive bridge components can be arranged in an AMR Wheatstone bridge configuration composed of, for example, four or more magnetoresistors. Such magnetoresistive bridge components can be, for example, anisotropic magnetoresistive (AMR) transducers. The target itself can be, for example, a crankshaft, a camshaft, etc.

Note that the aforementioned embodiments are less susceptible to temperature effects because the transducers utilized operate in a field that is close to (i.e., or centered about) a zero gauss (i.e., in the sensor's sensitive axis(s)). Such a design can be referred to as constituting low-bias configuration. Other configurations may place the sensor at a high bias field. Temperature effects that cause, for example, a 5% change in magnetic field from the magnet, would cause a large change in bias for the high bias configuration, and a small change in bias for the low bias configuration.

A transducer, however, such as a Hall and/or AMR component, provide an axis in which such devices are sensitive to a magnetic field and an axis in which they are not. Thus, by properly orienting the transducer relative to the magnet, one can create low or high bias situations on the face or on the side of the magnet. Thus, it is not that the transducer on the side alone necessarily causes a low bias (i.e., and low temperature effects). It is the proper positioning of the transducer(s) relative to the magnet in the 3 translational axis and 3 rotational axis.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A magnetic sensor, comprising:
    a target comprising a plurality of teeth and a plurality of slots formed there between;

a magnet having a first end located proximate to said target and a second end located away from said target;

an integrated circuit comprising a magnetoresistive Wheatstone bridge having a plurality of magnetoresistive bridge components comprising a first group of magnetoresistive bridge components located within a first region of said integrated circuit and a second group of magnetoresistive bridge components located within a second region of said integrated circuit adjacent said first region; wherein said first group of magnetoresistive bridge components comprise a second magnetoresistive component and a fourth magnetoresistive component located in parallel with each other in said first region, and wherein said second group of magnetoreistive components comprise a first magnetoresistive component and third magnetoresistive component located in parallel with each other in said second region; and wherein said first magnetoresistive component and said fourth magnetoresistive component are electrically connected in a leg of said magnetoresistive Wheatstone bridge and wherein said second magnetoresistive component and said third magnetoresistive component are electrically connected in another leg of said magnetoresistive Wheatstone bridge;

wherein said integrated circuit and said magnet are configured into a sensor package, such that said integrated circuit is located proximate said first end of said magnet and away from said second end with said magnetoresistive Wheatstone bridge in a plane facing a side of said magnet extending between said first and second ends, said first and second groups of magnetoresistive bridge components being located side by side in the direction of motion of said target, to enable said magnetoresistive to detect an edge of at least one tooth among said plurality of teeth when a half of said plurality of magnetoresistive bridge components come into proximity with said edge of said at least one tooth before that of another half of said plurality of magnetoresistive bridge components.

2. The sensor of claim 1 wherein said magnetoresistive Wheatstone bridge comprises an AMR Wheatstone bridge configuration.

3. The sensor of claim 2 wherein said AMR Wheatstone bridge configuration comprises four magnetoresistors.

4. The sensor of claim 2 wherein said plurality of magnetoresistive bridge components comprise anisotropic magnetoresistive (AMR) transducers.

5. The sensor of claim 1 wherein said target comprises a crankshaft.

6. The sensor of claim 1 wherein said target comprises a camshaft.

7. The sensor of claim 1 wherein said plurality of teeth comprises gearteeth and wherein said at least one tooth among said plurality of teeth comprises a geartooth.

8. A magnetic sensing system, comprising:

a target comprising a plurality of teeth and a plurality of slots formed there between;

a sensor package;

a magnet having a first end located proximate to said target and a second end located away from said target;

an integrated circuit comprising a magnetoresistive bridge having a plurality of magnetoresistive bridge components comprising a first group of magnetoresistive bridge components located within a first region of said integrated circuit and a second group of magnetoresistive bridge components located within a second region of said integrated circuit adjacent said first region, and wherein said sensor package also includes a sensor module including said integrated circuit, and a relatively flat lead frame; said magnet being located in a slot of said sensor module and said relatively flat lead frame having a relative flat portion upon which said integrated circuit sensor module and magnet are placed such that said integrated circuit is located proximate a first end of said magnet and away from said second end with said magnetoresistive bridge in a plane and facing a side of said magnet extending between said first and second ends, said first and second groups of magnetoresistive bridge components being located side by side in the direction of motion of said target, to enable said magnetoresistive bridge to detect an edge of at least one tooth among said plurality of teeth when a half of said plurality of magnetoresistive bridge components come into proximity with a said edge of said at least one tooth before that of another half of said plurality of magnetoresistive bridge components as said at least one tooth and an associated slot thereof pass by said sensor package.

9. The system of claim 8 wherein said magnetoresistive bridge comprises an AMR Wheatstone bridge configuration.

10. The system of claim 9 wherein said AMR Wheatstone bridge configuration comprises four magnetoresistors.

11. The system of claim 9 wherein said first group of magnetoresistive bridge components comprise a second anisotropic magnetoresistive (AMR) transducer and a fourth AMR transducer located in parallel with each other in said first region, and wherein said second group of magnetoresistive components comprise a first AMR transducer and third AMR transducer located in parallel with each other in said second region; and wherein said first AMR transducer and said fourth AMR transducer are electrically connected in a leg of said AMR Wheatstone bridge and wherein said second AMR transducer and said third AMR transducer are electrically connected in another leg of said AMR Wheatstone bridge.

12. The system of claim 9 wherein said target comprises a camshaft.

13. A magnetic sensing method, comprising:

providing a target comprising a plurality of teeth and a plurality of slots formed therebetween;

providing a magnet having a first end proximate to said target and a second end located away from said target;

forming an integrated circuit comprising a magnetoresistive Wheatstone bridge having a plurality of magnetoresistive bridge components, wherein forming said integrated circuit comprises locating a first group of magnetoresistive bridge components within a first region of said integrated circuit and a second group of magnetoresistive bridge components located within a second region of said integrated circuit adjacent said first region; wherein locating said first group of magnetoresistive bridge components comprises locating a second magnetoresistive component and a fourth magnetoresistive component in parallel with each other in said first region, and wherein locating said second group of magnetoresistive components comprises locating a first magnetoresistive component and third magnetoresistive component in parallel with each other in said second region; and wherein said first magnetoresistive component and said fourth magnetoresistive component are electrically connected in a leg of said magnetoresistive Wheatstone bridge and wherein said second magnetoresistive component and said third magnetoresistive component are electrically connected in another leg of said magnetoresistive Wheatstone bridge; and configuring said integrated circuit and said magnet into a sensor package; wherein configuring said integrated circuit and said magnet into said sensor package includes locating said integrated circuit proximate said first end of said magnet and away from said second end with said magnetoresistive bridge in a plane facing a side of said magnet extending between said first and second ends, said first and second groups of magnetoresistive bridge components being located side by side in the direction of motion of said target, to enable said magnetoresistive to detect an edge of at least one tooth among said plurality of teeth to enable said magnetoresistive bridge to detect an edge of at least one tooth among said plurality of teeth when a half of said plurality of magnetoresistive bridge components come into proximity with said edge of said at least one tooth before that of another half of said plurality of magnetoresistive bridge components.

14. The method of claim 13 wherein said magnetoresistive Wheatstone bridge comprises an AMR Wheatstone bridge configuration.

15. The method of claim 14 further comprising configuring said AMR Wheatstone bridge configuration to comprise four magnetoresistors.

16. The method of claim 13 wherein said plurality of magnetoresistive bridge components comprise an isotropic magnetoresistive (AMR) transducers.

17. The method of claim 13 wherein said plurality of teeth comprises gearteeth and wherein said at least one tooth among said plurality of teeth comprises a geartooth.

* * * * *